(12) United States Patent
Shaheen

(10) Patent No.: US 6,430,273 B1
(45) Date of Patent: Aug. 6, 2002

(54) SYSTEM AND METHOD OF PROVIDING A BI-DIRECTIONAL DSL CONNECTION

(75) Inventor: Robert C. Shaheen, Littleton, CO (US)

(73) Assignee: U.S. West, Inc., Denver, CO (US)

( * ) Notice: Subject to any disclaimer, the term of this patent is extended or adjusted under 35 U.S.C. 154(b) by 0 days.

(21) Appl. No.: 09/523,508

(22) Filed: Mar. 10, 2000

(51) Int. Cl.[7] .............................................. H04M 11/00
(52) U.S. Cl. ............................... 379/93.14; 379/93.28; 379/187; 370/480
(58) Field of Search .......................... 379/90.01, 93.28, 379/93.14, 187; 370/494, 480; 375/222; 709/227

(56) References Cited

U.S. PATENT DOCUMENTS 5,852,655 A  * 12/1998 McHale et al. .......... 379/93.28
5,918,213 A  *  6/1999 Bernard et al. ............... 705/26
6,105,067 A  *  8/2000 Batra ......................... 709/727

FOREIGN PATENT DOCUMENTS

JP            403116348 A  *  5/1991   ........... G06F/13/00

* cited by examiner

Primary Examiner—Melur Ramakrishnaiah
(74) Attorney, Agent, or Firm—Townsend and Townsend and Crew LLP

(57) ABSTRACT

A system for providing a bi-directional digital subscriber line connection to a network includes a digital subscriber line access multiplexer with a pool of digital subscriber line modems, and switching logic connecting customer premises to the modem pool. The switching logic has more inputs than outputs, and is configured to share access to the modem pool among the inputs on a per-session basis. A session has a dedicated modem connection to the network to provide a limited number of simultaneous dedicated digital subscriber line bi-directional connections to the network.

18 Claims, 3 Drawing Sheets

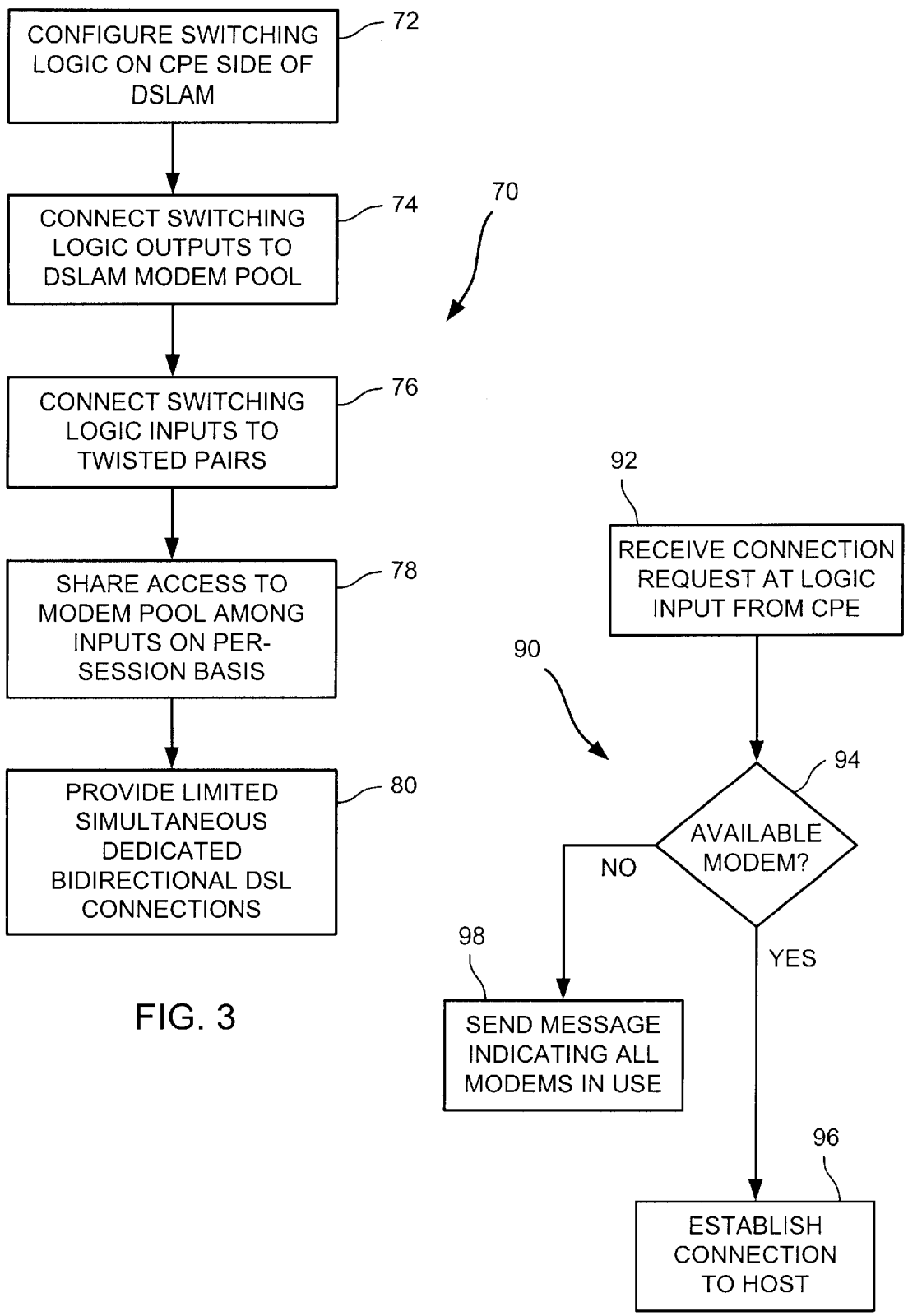

SYSTEM AND METHOD OF PROVIDING A BI-DIRECTIONAL DSL CONNECTION

TECHNICAL FIELD

The present invention relates to systems and methods of providing a bi-directional digital subscriber line (DSL) connection to a network, wherein a DSL modem at the customer premise connects to a DSL modem at a digital subscriber line access multiplexer (DSLAM).

BACKGROUND ART xDSL services, also commonly referred to as simply DSL or digital subscriber line services, are dependent on line conditions because DSL is implemented over twisted copper pairs. Further, there are many different flavors of digital subscriber line services, each providing service over different distances, and having different bandwidths. Some implementations for DSL are asymmetric, meaning that the downstream bandwidth is different than the upstream bandwidth. Other implementations for DSL services are symmetric. xDSL technologies provide extremely high bandwidth over an embedded twisted pair, copper loop.

In existing deployments of DSL Services, the customer has a dedicated bi-directional digital subscriber line (DSL) connection from the customer premise to the central office. At the central office, the customer is connected to a network such as the Internet. A DSL modem is different than the typical analog modem. In a DSL implementation, a DSL modem at the customer's premise receives the incoming twisted pair and connects to, for example, a home network, such as, for example, a home Ethernet network. On the central office side, the other end of the twisted pair is connected to a DSL modem at a digital subscriber line access multiplexer (DSLAM). The DSLAM includes a modem for every customer premise modem to provide a number of always-on, bi-directional, dedicated digital subscriber line connections.

That is, in existing DSL implementations, the provider must supply a DSL modem at the DSLAM for every customer DSL modem, which may quickly get expensive with increases in customer demand. For the foregoing reasons, there is a need for a method and system of providing a bi-directional digital subscriber line connection to a network that reduces cost for DSL implementation while still providing adequate service for the DSL customers.

DISCLOSURE OF INVENTION

It is, therefore, an object of the present invention to provide a system for providing a bi-directional DSL connection to a network in which switching logic has a number of inputs connected to digital subscriber lines that extend to customer premises, wherein the number of inputs is greater than a number of outputs, with the outputs being connected to a pool of provider DSL modems, allowing DSL modem pooling at the provider end.

In carrying out the above object, a system for providing a bi-directional digital subscriber line (DSL) connection to a network is provided. The system comprises a digital subscriber line access multiplexer (DSLAM) including a pool of digital subscriber line modems. The multiplexer provides communication between each modem and the network. The system further comprises switching logic. The switching logic has a number of inputs and a number of outputs. Each input is connected to a digital subscriber line that extends to a customer premise. Each output is connected to a modem in the modem pool. The number of inputs is greater than the number of outputs. The switching logic is configured to share access to the modem pool among the inputs on a per-session basis with a session having a dedicated modem connection to the network to provide a limited number of simultaneous dedicated digital subscriber line bi-directional connections to the network.

It is to be appreciated that embodiments of the present invention may be suitable for various flavors of xDSL, including rate adaptive digital subscriber line (RADSL) technology for subscriber end service delivery with asynchronous transfer mode (ATM) for host end connectivity. Of course, other flavors of xDSL may be used for subscriber end service delivery and other techniques may be used for host end connectivity. For example, the twisted pair may run from the central office, or in the alternative, fiber to the neighborhood or fiber to the curb may be used to extend the reach of the network (for example, VSDL implementations of xDSL).

In a suitable implementation, depending on customer demand, the number of switching logic inputs may be at least two times the number of switching logic outputs. Further, in some embodiments, the number of switching logic inputs may be at least three times the number of switching logic outputs. The ratio of inputs to outputs for the switching logic may be determined based on customer demand and usage patterns. Of course, the present invention is not limited to any particular inputs to outputs ratio, and some embodiments have an inputs to outputs ratio as great as six to one. Further, even greater ratios are contemplated for some embodiments of the present invention. For example, depending on customer demand and usage patterns, ratios as great as ten to one or even twelve to one for switching logic inputs to outputs may be employed.

In a preferred implementation, each simultaneous digital subscriber line connection to the network has an upstream bandwidth of at least 256 kilobytes per second. Further, in a preferred implementation, a downstream bandwidth of at least 256 kilobytes per second is provided. As such, embodiments of the present invention allow a symmetric bi-directional digital subscriber line connection of a relatively low bandwidth of 256 kilobytes per second to be provided, with modem pooling, to lower the cost to the provider and effectively lower the end cost to the customer so that more customers may enjoy the benefits of DSL service. In some embodiments, DSL is implemented asymmetrically with the downstream bandwidth being greater than the upstream bandwidth.

In a preferred implementation, the switching logic is configured with timing logic to share access to the modem pool. Preferably, the switching logic is configured with idle timer logic, session timer logic, and lockout timer logic.

The idle timer logic disconnects a connection between an input and an output of the switching logic after the expiration of a predetermined period of time with the connection remaining idle. The session timer logic disconnects a connection between the input and an output of the switching logic after the expiration of a predetermined period of time since the creation of the connection (session time limit). The lockout timer logic prevents the creation of a connection between an input and any output of the switching logic until the expiration of a predetermined period of time after disconnection of the input from any output by the session timer logic.

Further, in carrying out the present invention, a method of providing a bi-directional digital subscriber line (DSL)

connection to a network is provided. A digital subscriber line access multiplexer (DSLAM) includes a pool of digital subscriber line modems. The DSLAM provides communication between each modem and the network. The method comprises configuring switching logic and sharing access to the modem pool. The switching logic is configured between the multiplexer and a plurality of customer premises. The switching logic has a number of inputs and a number of outputs. Each input is connected to a digital subscriber line that extends to a customer premise. Each output is connected to a modem in the pool. The number of inputs is greater than the number of outputs to allow modem pooling. Access to the modem pool is shared among the inputs on a per-session basis with a session having a dedicated modem connection to the network to provide a limited number of simultaneous dedicated digital subscriber line bi-directional connections to the network.

In some implementations, depending on customer demand, the number of switching logic inputs may be at least two times the number of switching logic outputs. Further, the number of switching logic input may be at least three times the number of switching logic outputs. Of course, the present invention is not limited to any particular inputs to outputs ratio, and some embodiments have an inputs to outputs ratio as great as six to one. Further, even greater ratios are contemplated for some embodiments of the present invention. For example, depending on customer demand and usage patterns, ratios as great as ten to one or even twelve to one for switching logic inputs to outputs may be employed.

Preferred embodiments for the invention further comprise configuring the switching logic to share access to the modem pool by, upon receiving a connection request from a customer premise at an input when each output is already in use by a dedicated connection to the network from a different input, sending a message to the customer premise indicating that all modems are currently in use. Preferably, the invention further comprises configuring the switching logic to share access to the modem pool by, upon receiving a connection request from a customer premise at an input when an output is available for use, establishing a digital subscriber line connection to the network including a connection between the requesting input and any available output. Still further, in a preferred embodiment, the method further comprises configuring the switching logic with idle timer logic, session timer logic, and lockout timer logic.

The advantages associated with the embodiments of the present invention are numerous. For example, systems and methods of the present invention provide DSL modem pooling at a provider central office or a remote DSLAM for FTTx configurations. Embodiments of the present invention allow the provider to, based on customer demand and usage patterns, oversubscribe services and resultantly reduce the cost of the network allowing DSL to reach more people, faster, and cheaper. It is to be appreciated that the switching logic inputs to outputs ratio (the amount of over subscription) may vary in different implementations of the present invention. For example, an input to output ratio may be two to one (2 to 1), three to one (3 to 1), six to one (6 to 1), ten to one (10 to 1), twelve to one (12 to 1), or any other ratio as deemed appropriate for the particular DSL implementations.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 3 is a block diagram illustrating a method of the present invention; and

FIG. 4 is a block diagram illustrating another method of the present invention.

BEST MODE FOR CARRYING OUT THE INVENTION

Figure 1:
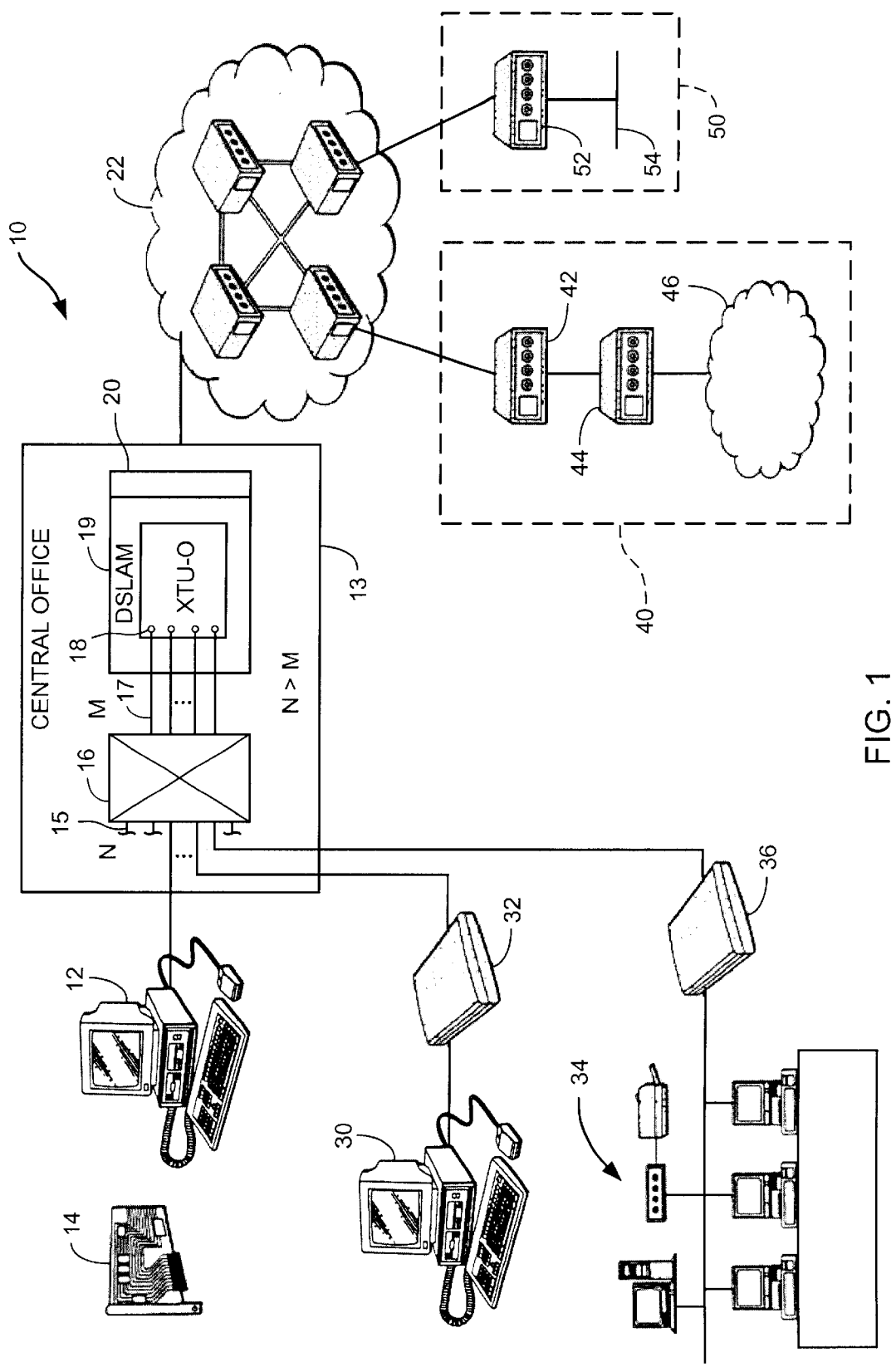
FIG. 1 is a network environment of the present invention showing DSL modem pooling at a DSLAM in the central office.

Referring to FIG. 1, network architecture suitable for use with embodiments of the present invention is generally indicated at 10. Subscribers, or customers, may reach the network in a variety of ways. For example, a computer 12 may have an internal peripheral component interconnect (PCI) card 14 used for DSL access. Computer 12 is connected to a digital subscriber line access multiplexer (DSLAM) 19 at central office 13. Alternatively, computer 12 may connect to a plain old telephone system (POTS) splitter (not shown), which in turn, connects to the public switched telephone network (PSTN), with the other output of the POTS splitter being connected to the DSLAM.

As mentioned above, subscribers may access the network in a variety of ways with the internal PCI board DSL modem being one such technique. In another example, a computer 30 may have an internal Ethernet card and an external DSL modem 32. In another example, an Ethernet local area network (LAN) 34 may use an external DSL modem 36 to reach central office 13. It is appreciated that in accordance with the present invention, the DSL modems 14, 32, 36 do not connect directly to DSLAM 19. Instead, the DSL modem is connected to inputs 15 of switching logic 16. Switching logic 16 has outputs 17 that connect to DSL modems 18 in a DSL modem pool at DSLAM 19. As shown, there are N inputs 15 and M outputs 17, with N being greater than M. That is, N DSL modems share a modem pool consisting of M DSL modems, with switching logic 16 controlling connections between customer modems and DSLAM modems 18. Of course, it is appreciated that the ratio of switching logic inputs to outputs may vary for different implementations of the present invention.

DSLAM 19 has an adaption layer 20 for connecting to data network 22. In a suitable implementation, adaption layer 20 is an asynchronous transfer mode (ATM) adaption layer, and network 22 is an ATM network. Of course, other data networks may be used in the alternative. As shown, an Internet Service Provider (ISP) 40 connects to network 22 and utilizes routers 42 and 44 to grant access to Internet 46. On the other hand, corporate LAN 50 is shown with a router 52 and an Ethernet network 54. Of course, connections to data network 22 may be configured in a variety of different ways, with the modem connections through the DSLAM, the ISP connection through the routers, and the corporate LAN connections being examples.

With continuing reference to FIG. 1, DSLAM 19 includes a pool of DSL modems 18. Switching logic 16 has inputs 15 connected to DSL twisted pairs that extend to customer premises. Outputs 17 of switching logic 16 connect to modems 18 in the modem pool. Switching logic 16 is configured to share access to the modem pool among the inputs on a per-session basis. During a session, a customer at the customer modem 12, 32, 36 has a dedicated modem connection to network 22 to provide a limited number (that is, the number of DSL modems in the DSLAM modem pool) of simultaneous dedicated digital subscriber line bi-directional connections to network 22.

Figure 2:
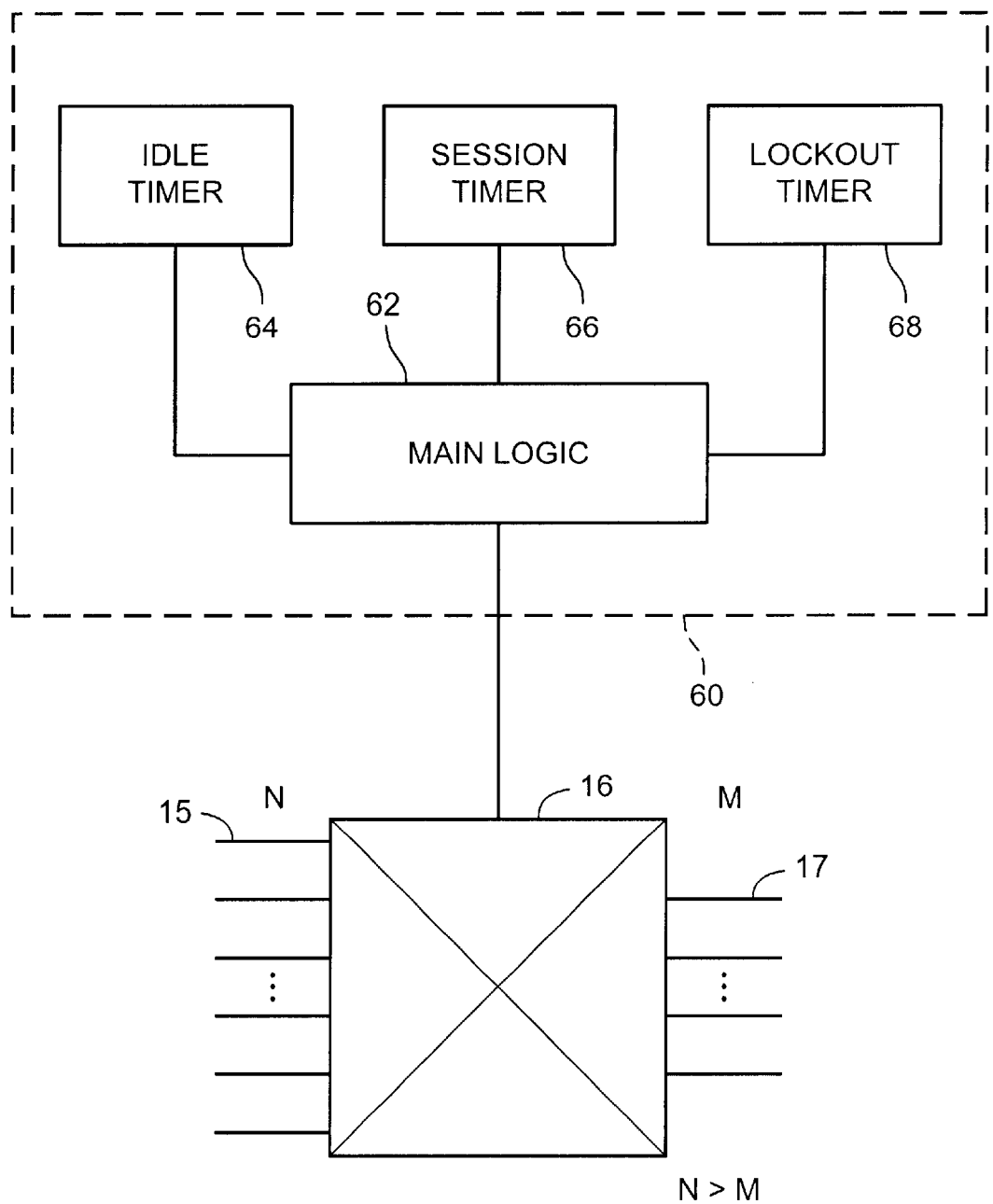
FIG. 2 is a diagram showing the idle timer, session timer and lockout timer in a preferred implementation of the present invention.

In preferred embodiments of the present invention, switching logic 16 includes additional logic to manage the sharing of modems 18 in the modem pool among the different inputs 15 to switching logic 16 so that each subscriber or customer gets fair use of the modem pool. In FIG. 2, switching logic 16 and inputs 15 and outputs 17 are managed by logic 60. Main logic 62 creates and terminates connections between various inputs 15 and outputs 17 in response to a request received at one of the inputs. That is, main logic 62, upon receiving a connection request from a customer premise at an input when each output (and pooled modem) is already in use by a dedicated connection to the network from a different input, sends a message to the requesting customer premise indicating that all modems are currently in use. On the other hand, upon receiving a connection request from a customer premise at an input when an output is available for use, main logic 62 establishes a digital subscriber line connection to the network, including a connection between the requesting input and one of the available outputs 17.

In a preferred embodiment, logic 60 is further configured with idle timer logic 64, session timer logic 66, and lockout timer logic 68. Idle timer 64 disconnects a connection between an input and an output after the expiration of a predetermined period of time with the connection remaining idle. That is, idle timer 64 frees up modems in the modem pool that are taken by a connection that is not being actively used. Session timer 66 disconnects the connection between an output and an input after the expiration of a predetermined period of time since the creation of the connection. That is, session timer 66 limits the maximum connect time for a single user session. Further, lockout timer 68 prevents the creation of a connection between an input and any output until the expiration of a predetermined period of time after disconnection of that input and any output was made by the session timer 66. That is, lockout timer 68 makes the user wait a predetermined amount of time before creating another connection to network 22 after having been connected to network 22 for the session time limit.

In FIG. 3, a method of the present invention is generally indicated at 70. At block 72, switching logic is configured on the customer premise equipment (CPE) side of the DSLAM. At block 74, switching logic outputs are connected to DSL modems in a DSLAM modem pool. At block 76, switching logic inputs are connected to twisted pairs that extend to the customer premise DSL modems. At block 78, access to the modem pool is shared among inputs on a per-session basis. At block 80, limited simultaneous dedicated bi-directional DSL connections are provided.

In accordance with the present invention, switching logic provides a limited number of simultaneous dedicated bi-directional DSL connections, one connection for each DSL modem at the DSLAM. However, the present invention allows for more modems at customer sites than at the DSLAM, that is, allows oversubscribing of DSL services. Based on customer usage patterns, oversubscribing of DSL modems may reduce the overall costs associated with providing DSL service without unreasonably limiting availability of DSL service. Advantageously, modem pooling may reduce the cost of bringing DSL service to an area, it may allow some of the cost savings to be passed on to customers. Further, in some embodiments of the present invention, bandwidths in the area of 256 kilobytes per second may be provided for both upstream and downstream data. As such, limiting the bandwidth for a session connection may further help reduce the overall cost of bringing DSL service to the customers.

In FIG. 4, a method of the present invention is generally indicated at 90. At block 92, a connection request is received at an input of the switching logic from a customer premise equipment modem. At block 94, switching logic 16 (FIG. 2) checks for an available DSL modem in the DSLAM. If a modem is available in the modem pool at the DSLAM, at block 96, a connection to a host on network 22 is established. The host may be, for example, an Internet Service Provider or a corporate network. At block 98, in the event there are not any available modems in the modem pool, a message is sent indicating that all modems are in use and that the customer should try connecting again later. Alternatively, the requesting customer could be placed in a queue of requesting customers, and given the next available modem after any available modems are given to customers ahead of that customer in the queue.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for providing a bi-directional digital subscriber line (DSL) connection to a network, the system comprising:

a digital subscriber line access multiplexor including a pool of digital subscriber line modems, the multiplexor providing communication between each modem and the network; and switching logic having a number of inputs and a number of outputs, each input being connected to a digital subscriber line that extends to a customer premise, and each output being connected to a modem in the pool, wherein the number of inputs is greater than the number of outputs, and wherein the switching logic is configured to share access to the modem pool among the inputs on a per-session basis with a session having a dedicated modem connection to the network to provide a limited number of simultaneous dedicated digital subscriber line bi-directional connections to the network wherein the switching logic is configured with session timer logic, the session timer logic disconnecting a connection between an input and an output after the expiration of a predetermined period of time since the creation of the connection.

2. The system of claim 1 wherein the number of switching logic inputs is at least two times the number of switching logic outputs.

3. The system of claim 2 wherein the number of switching logic inputs is at least three times the number of switching logic outputs.

4. The system of claim 1 wherein each simultaneous digital subscriber line connection to the network has an upstream bandwidth of at least 256 kilobytes per second and a downstream bandwidth of at least 256 kilobytes per second.

5. The system of claim 4 wherein the downstream bandwidth is greater than the upstream bandwidth.

6. The system of claim 1 wherein the switching logic is configured to share access to the modem pool by, upon receiving a connection request from a customer premise at an input when each output is already in use by a dedicated connection to the network from a different input, sending a message to the requesting customer premise indicating that all modems are currently in use.

7. The system of claim 1 wherein the switching logic is configured to share access to the modem pool by, upon receiving a connection request from a customer premise at an input when an output is available for use, establishing a digital subscriber line connection to the network including a connection between the requesting input and the available output.

8. The system of claim 1 wherein the switching logic is configured with idle timer logic, the idle timer logic disconnecting a connection between an input and an output after the expiration of a predetermined period of time with the connection remaining idle.

9. The system of claim 1 wherein the switching logic is configured with lockout timer logic, the lockout timer logic preventing the creation of a connection between an input and any output until the expiration of a predetermined period of time after disconnection of the input and any output by the session timer logic.

10. A method of providing a bi-directional digital subscriber line (DSL) connection to a network wherein a digital subscriber line access multiplexor includes a pool of digital subscriber line modems, the multiplexor providing communication between each modem and the network, the method comprising:

configuring switching logic between the multiplexor and a plurality of customer premises, the switching logic having a number of inputs and a number of outputs, each input being connected to a digital subscriber line that extends to a customer premise, and each output being connected to a modem in the pool, wherein the number of inputs is greater than the number of outputs;

sharing access to the modem pool among the inputs on a per-session basis with a session having a dedicated modem connection to the network to provide a limited number of simultaneous dedicated digital subscriber line bi-directional connections to the network; and configuring the switching logic with session timer logic, the session timer logic disconnecting a connection between an input and an output after the expiration of a predetermined period of time since the creation of the connection.

11. The method of claim 10 wherein the number of switching logic inputs is at least two times the number of switching logic outputs.

12. The method of claim 11 wherein the number of switching logic inputs is at least three times the number of switching logic outputs.

13. The method of claim 10 wherein each simultaneous digital subscriber line connection to the network has an upstream bandwidth of at least 256 kilobytes per second and a downstream bandwidth of at least 256 kilobytes per second.

14. The method of claim 13 wherein the downstream bandwidth is greater than the upstream bandwidth.

15. The method of claim 10 further comprising:

configuring the switching logic to share access to the modem pool by, upon receiving a connection request from a customer premise at an input when each output is already in use by a dedicated connection to the network from a different input, sending a message to the requesting customer premise indicating that all modems are currently in use.

16. The method of claim 10 further comprising:

configuring the switching logic to share access to the modem pool by, upon receiving a connection request from a customer premise at an input when an output is available for use, establishing a digital subscriber line connection to the network including a connection between the requesting input and the available output.

17. The method of claim 10 further comprising:

configuring the switching logic with idle timer logic, the idle timer logic disconnecting a connection between an input and an output after the expiration of a predetermined period of time with the connection remaining idle.

18. The method of claim 10 further comprising:

configuring the switching logic with lockout timer logic, the lockout timer logic preventing the creation of a connection between an input and any output until the expiration of a predetermined period of time after disconnection of the input and any output by the session tiner logic.

* * * * *

UNITED STATES PATENT AND TRADEMARK OFFICE
CERTIFICATE OF CORRECTION

PATENT NO.    : 6,430,273 B1
DATED         : August 6, 2002
INVENTOR(S)   : Shaheen It is certified that error appears in the above-identified patent and that said Letters Patent is hereby corrected as shown below:

<u>Title page,</u>
Item [73], Assignee, please insert the assignee information as:
-- Assignee:  Qwest Communications International Inc., Denver, CO, USA --

Signed and Sealed this

Fourth Day of November, 2003

JAMES E. ROGAN
*Director of the United States Patent and Trademark Office*